Figure 1:
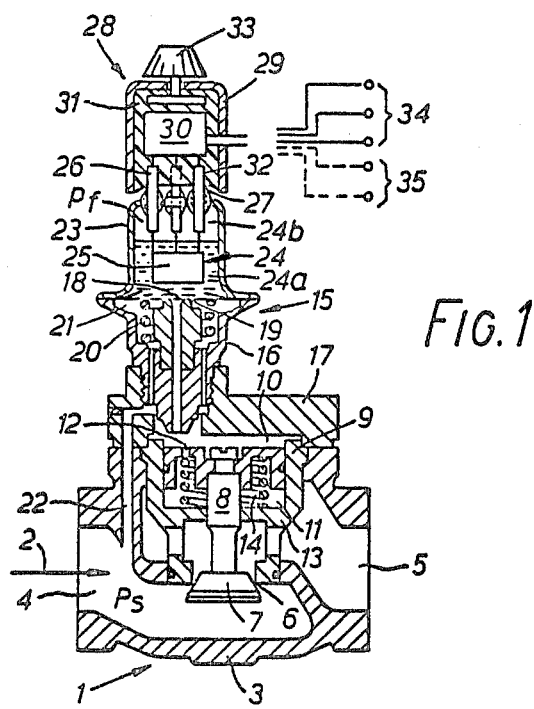

United States Patent [19]

Jakobsen

[11] 4,248,377

[45] Feb. 3, 1981

[54] CONTROLLABLE HEATING MEANS FOR SMALL MASSES, PARTICULARLY THE EXPANSION MEDIUM IN HEAT SETTING APPARATUSES

[75] Inventor: Jakob S. Jakobsen, Sonderborg, Denmark

[73] Assignee: Danfoss A/S, Nordborg, Denmark

[21] Appl. No.: 956,495

[22] Filed: Nov. 1, 1978

[30] Foreign Application Priority Data

Nov. 3, 1977 [DE] Fed. Rep. of Germany ....... 2749251

[51] Int. Cl.$^3$ ...................... G05D 15/00; G05D 23/00
[52] U.S. Cl. .................................... 236/68 B; 251/11; 307/362
[58] Field of Search ....................... 236/68 R; 251/11; 307/362, 310; 73/362 SC

[56] References Cited

U.S. PATENT DOCUMENTS

| | | | |
|---|---|---|---|
| 2,696,739 | 12/1954 | Endres | 73/362 SC |
| 2,871,376 | 1/1959 | Kretzmer | 73/362 SC |
| 3,413,438 | 11/1968 | Gardner et al. | 219/210 |

*Primary Examiner*—William E. Wayner

*Attorney, Agent, or Firm*—Wayne B. Easton

[57] ABSTRACT

The invention relates to a controlled heating system for maintaining a predetermined or set temperature in a medium of small dimensions which may be a gas, liquid or solid. A single element such as a power transistor functions as a heat transfer device for supplying heat to the medium and as a heat sensing device for sensing temperature changes in the medium which can be fed back and serve as control data for supplying make-up heat to maintain a predetermined temperature. The transistor supplies heat via heat dissipation in its collector-emitter path and senses heat changes via its base-emitter voltage which varies in response to temperature changes in the medium. The controlled heating may be applied to a valve assembly for a refrigeration plant of the kind used for controlling the flow of refrigerant from the evaporator to the compressor. The closure member for the valve unit is controlled directly or indirectly by a movable wall of an expansible chamber filled with a refrigerant medium having vapor and liquid phases. The transistor serves as a heat transfer element and as a temperature responsive sensor element.

6 Claims, 2 Drawing Figures

CONTROLLABLE HEATING MEANS FOR SMALL MASSES, PARTICULARLY THE EXPANSION MEDIUM IN HEAT SETTING APPARATUSES

The invention relates to controllable heating means for small masses, particularly the expansion medium in heat setting apparatuses, comprising a heating element and a temperature sensor disposed in the mass, and a regulating unit which controls the heating current at least in response to the temperature signal of the temperature sensor.

A heat setting element is known in which a heating resistor and a temperature sensor are disposed in its expansion medium. Heating is effected by means of a control circuit in such a way that a temperature predeterminable at the regulator is kept constant. Since the temperature corresponds to a particular expansion of the expansion medium, one in this way obtains regulation of the position. Various other applications are also known in the prior art, in which small masses have to be kept at a constant temperature, e.g. to receive the one soldered point of a thermoelement serving for temperature measurement.

Two elements are required in every case, namely the heating element and a temperature sensor. These are disposed in different electric circuits and must therefore be arranged in the mass so that they do not collide with each other. This calls for a stable assembly and a certain minimum amount of this mass.

The invention is based on the problem of providing controllable heating means of the aforementioned kind which are easier to assemble and for which comparatively small masses are also suitable.

This problem is solved according to the invention in that the heating element is a transistor effecting heating by means of its power loss and that the voltage drop at its base-emitter path serves as the temperature signal.

Transistors have a power loss which depends on the collector current. By influencing the collector current one can therefore change the heat output. Compared with the volume of the transistor, relatively high power losses can be obtained with power transistors. Further, the voltage at the base-emitter path of a transistor changes with the temperature. In a silicon transistor, the temperature change is around 0.002 V/°C. By measuring this voltage one therefore obtains a temperature signal. In this way one requires only one element for heating and for detecting the temperature. Assembly is correspondingly simple. One obtains a compact, robust and cheap construction which is very secure against impacts. Since there is no danger of collisions between two doments and transistors can have comparatively small structural sizes, comparatively small masses, particularly liquids, can also be controllably heated. If the mass is smaller, a smaller transistor with a lower power loss will also suffice and this can be readily accommodated within this mass. The upper limit of the term 'small masses' is defined in that the heat given off at a temperature that is to be maintained can be replenished by the power loss of a transistor, particularly a power transistor.

In a preferred example, it is ensured that the collector-emitter path of the heating transistor is in series with a current regulator which is controlled by an amplifier, that the emitter is connected by way of a series resistor to the one input of the amplifier, and that the base is connected to the other input by way of a reference voltage generator. This results in a very simple regulating unit in which the emitter voltage is compared with a reference voltage. Upon insufficient voltage, the amplifier produces an output signal which influences the current regulator and thereby brings about a certain collector current. If the voltage is too high, this collector current is interrupted so that the desired temperature is restored as a result of cooling of the mass.

Preferably, the collector is connected by way of the current regulator to the one pole, the emitter by way of an emitter resistor to the other pole of a D.C. voltage source and the base to a middle connection having an intermediate voltage, and the reference voltage generator comprises a voltage divider which is connected between the middle connection and the other pole and of which the tapping is connected to the other input of the amplifier. This permits a very simple construction for the reference voltage generator. By adjusting the tapping of the voltage divider, the reference voltage can be set to any desired value.

In addition, the voltage divider may comprise an outside, for example temperature-responsive sensing resistor which is adjustable by an external parameter, and a desired value setting resistor. One can therefore also influence the mass in dependence on an external sensing signal, for example in response to the air temperature in a room which, in turn, is controllable by a valve influenced by means of the heat setting element.

In a preferred example, it is ensured that the mass to be heated and the power transistor are disposed in a working vessel which has a displaceable wall and is closed by a duct having three insulatingly held pins each connected to a respective one of the connections of the heating resistor, and that the regulator unit is accommodated in a housing having in its wall a fitting for plugging onto the pins. In this case the working vessel and housing can be cylindrical and have the duct and fitting at their ends. At the end opposite to the fitting, the housing can have a manual actuating element for setting the desired value. In this way one obtains a two-part setting device which can be placed on a valve or the like without difficulty. The regulator unit and setting device are easily separated from each other. In particular, the setting device may be selectively provided with different regulator units, e.g. with a regulator unit having only one manual adjustment or a regulator unit which works in response to an external sensing signal.

With particular advantage, the expansion medium is a liquid/vapour filling. With such a filling, the temperature at the separating face corresponds to a certain vapour pressure. One can therefore use the setting element as a reference pressure generator. For this application, the question of heating small masses is of particular importance because the working vessel is only partially filled with liquid and heating as well as measurement of temperature must take place in this partial filling. However, when using a heating transistor measuring the temperature one can, despite the partial filling, make do with very small working vessels. If these are more than half filled with liquid, particularly about 70%, it is even possible to place the working vessel in any desired position in the room.

In particular, the liquid/vapour filling may be accommodated in a working vessel closed by a displaceable plate such as a diaphragm or the base of bellows, and the plate can be biassed in the opposite direction by the vapour pressure of a refrigerant and actuate a refrigeration valve controlling this pressure. This results in a very simple construction because the vapour pressure in the working vessel is compared directly with the vapour pressure in the refrigeration valve and the latter is adjusted in the sense of a predetermined relationship between the two pressures. Such a refrigeration valve can be used as a suction pressure regulator, thermovalve, capacity regulator etc. in refrigeration or air-conditioning installations.

Above all, the refrigeration valve may be a pilot valve controlling a main valve. Such a pilot valve is inherently smaller than the main valve that is to be controlled. The liquid/vapour filling of the working vessel is correspondingly small.

Figure 2:
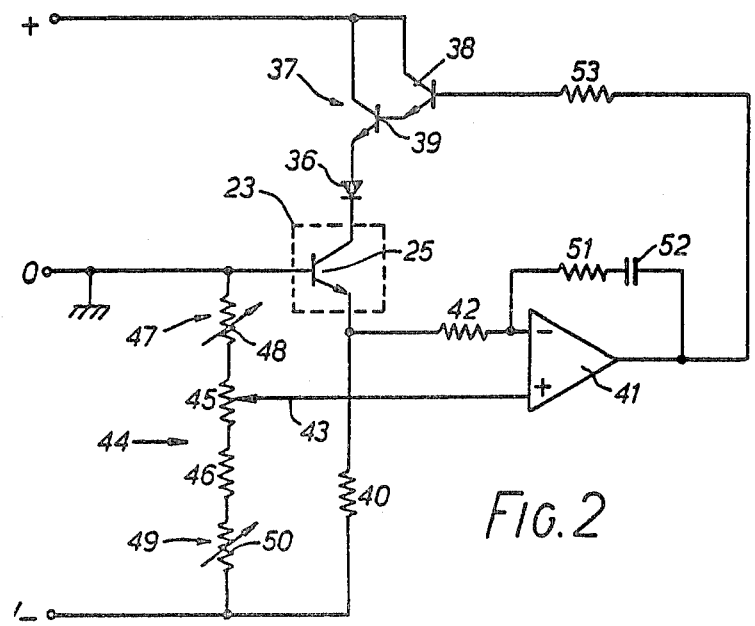

The invention will now be described in more detail with reference to an example illustrated in the drawing, wherein:

FIG. 1 shows the construction of a controllable heating device according to the invention in conjunction with a pilot valve controlling a main valve in a refrigeration plant, and FIG. 2 shows a circuit for the controllable heating device.

A main valve 1 is installed in the suction conduit of a refrigeration plant between the evaporator and compressor. It has a housing 3 with a supply side 4 and an outlet side 5. The valve seat 6 therebetween co-operates with a closure member 7 connected to a piston 9 by way of a shank 8. The piston separates a pressure chamber 10 from a pressure chamber 11. Both pressure chambers are interconnected by a throttle 12. The pressure chamber 11 is connected to the outlet side by way of a throttle 13. There is also a spring 14. The piston 9 and thus the closure member 7 therefore assume a position in which the pressure difference in the chambers 10 and 11 corresponds to the force of the spring 14.

This pressure difference is controlled with the aid of a pilot valve 15 of which the housing 16 is screwed into the cover 17 of the main valve 1. As a closure member there is a diaphragm 18 which co-operates with a valve seat 19 and is under the pressure of a spring 20. The annular chamber 21 beyond the valve seat 19 communicates with the supply side 4 by way of pilot passages 22 in the housing 3 and in the cover 17 of the main valve 1. The more the pilot valve opens, the greater is the amount of refrigerant flowing by way of the pilot valve and the throttle positions 12 and 13 and the greater will be the pressure drop at the throttle position 12. This leads to a corresponding wide opening of the closure member 7 of the main valve.

The diaphragm 18 forms a displaceable wall of a working vessel 23 provided with a filling 24 having a liquid phase 24a and a vapour phase 24b. Depending on the temperature at the liquid surface, a vapour pressure $p_f$ is obtained which loads the diaphragm 21 from the top whereas the suction pressure $p_s$ and the force of the spring 20 are effective from the bottom. The liquid phase 24a contains a power transistor 25 of which the leads for the base, emitter and collector are connected to the three pins 26 of a duct 27. These pins are held in glass insulations in apertures at the front of the working vessel 23. A regulator unit 28 is accommodated in a housing 29 in which the individual parts 30 of the regulator unit are embedded in plastics 31. At the side facing the working vessel 23, there is a fitting 32 having a plurality of sockets for the pins 26. At the opposite end there is a rotary knob 33 for manual setting of the desired value. Cables 34 for connection to a voltage source and cables 35 for connection to an outer sensor can be led out through a lateral duct.

By simply changing the temperature in the working vessel 23, one can change the vapour pressure $p_f$ and thus the suction pressure $p_s$. If the suction pressure changes as a result of external influences, the pilot valve 15 and thus the main valve 1 assume a different position at which the old conditions are restored. Regulation can be in such a way that a desired value for the suction pressure set with the rotary knob 33 can be maintained without change. However, instead of such a regulator unit one can also apply a different regulator unit in which the suction pressure is regulated in response to an outer temperature sensor, for example so that this outer temperature sensor detects the temperature of the medium to be cooled and the temperature is maintained at a value that can be set with the rotary knob 33. In this case the regulator unit may have a P behaviour a PI or proportional integrating behaviour or a complicated transmission function. It is also possible to control the suction pressure as a function of time.

The valve can also serve other purposes, for example the regulation of heat in a heating or air conditioning plant. Instead of a valve one can also actuate other devices, for example flow throttles. In each case it is important that heating of the expansion medium 24 takes place such that a particular temperature is maintained. For this purpose there is a single component, namely the transistor 25 which, by generating a heat loss, serves as a heating element and also measures the temperature with its base-emitter path. A circuit suitable for the controllable heating device is shown in FIG. 2. Three voltage connections are provided, namely the one pole V+ of a D.C. voltage source, the other pole V− of the D.C. voltage source and a middle connection O which has an intermediate voltage and is earthed. The cathode of the heating transistor 25 is applied to the one pole V+ by way of a diode 36 and a current regulator 37 having two transistors 38 and 39 in Darlington connection. Its emitter is connected to the other pole V− by way of an emitter resistor 40 and its base is connected to the middle connection O. An amplifier 41 has its one input connected to the emitter of the heating transistor 25 by way of a series resistor 42. The other input is connected to a tapping 43 of a voltage divider 44 which serves as a reference voltage generator and which extends between the middle connection O and the pole V− of the D.C. voltage source. The voltage divider consists of a potentiometer 45 and a fixed resistor 46. An outer temperature-dependent resistor 48, e.g. an NTC resistor, can be selectively connected at a first position 47 and a variable resistor 50 can be selectively connected at a second position 49. By reason of a feedback connection comprising a resistor 51 and a condenser 52, the amplifier 41 has a PI behaviour. The output controls the input of the current regulator 37 by way of a resistor 53.

In this regulator unit, the temperature in the vessel 23 assumes a value at which the voltage drop at the base-emitter path of the heating transistor 25 corresponds to the reference voltage set by means of the tapping 49. If the temperature drops, the voltage drop will also be reduced. The amplifier delivers an output signal by which the heating current is amplified by means of the current regulator 37. If the temperature rises, heating is interrupted until the temperature reaches the desired temperature by cooling off. The tapping 43 can be adjusted by means of the rotary knob 33. In this way one can set different temperatures and thus different suction pressures in the FIG. 1 embodiment.

If a temperature-dependent resistor 48 or a setting resistor 50 are connected at the positions 47 and 49, one also obtains dependence on this external sensor 48, particularly an NTC resistor, which is influenced by the cooled medium. The setting resistor 50 can also be incorporated in the regulator unit so that the desired temperature of the cooled medium can be set by the rotary knob 33.

What is claimed is:

1. A controlled heating system, comprising, casing means defining a chamber for a medium whose temperature is controlled by the alternate application of heat thereto and the cooling thereof by the transfer of heat to the atmosphere surrounding said casing, a power transistor for heating said medium by heat emitted therefrom, said transistor being disposed in said casing and submerged in said medium, three terminals extending from the outside of said casing to the interior thereof and being connected to the base, emitter and collector leads of said transistor, control means connected to said terminals including variable resistance means in the collector-emitter path of said transistor for controlling the heat emitted by said transistor, said control means including means for sensing the temperature of said medium by sensing the base-emitter voltage of said transistor, and amplifier means for varying the value of said variable resistance means proportionally relative to sensed changes of said base-emitter voltage.

2. A heating system according to claim 1, characterized in that said variable resistance means in said collector-emitter path is a current regulator controlled by said amplifier means.

3. A heating system according to claim 2 wherein said amplifier means has two inputs to which said emitter and base are respectively connected.

4. A heating system according to claim 3 including a reference voltage generator in the form of a voltage divider connected between said base and one of said amplifier inputs.

5. A heating system according to claim 4 characterized in that said voltage divider includes an outside temperature-responsive sensing resistor which is adjustable by an external parameter and a desired value setting resistor.

6. A heating system according to claim 1 characterized in that said chamber has a displaceable wall, said medium being an expansion medium in the form of a liquid/vapor filling.

* * * * *